United States Patent [19]

Roach

[11] Patent Number: 4,671,699

[45] Date of Patent: Jun. 9, 1987

[54] TURF COMPATIBLE PAVER SYSTEM

[76] Inventor: Edward F. Roach, 11245 Forestview La., San Diego, Calif. 92131

[21] Appl. No.: 872,001

[22] Filed: Jun. 9, 1986

[51] Int. Cl.⁴ .............................................. E01C 5/20
[52] U.S. Cl. ........................................ 404/41; 404/36; 404/40; 52/387; 52/660; 47/33
[58] Field of Search .................................. 404/34–36, 404/40–42, 32; 52/126.1, 126.5, 384, 386, 387, 660, 663; 47/33

[56] References Cited

U.S. PATENT DOCUMENTS

| | | | |
|---|---|---|---|
| 2,509,558 | 5/1950 | Cadjew | 404/42 X |
| 3,301,148 | 1/1967 | Schraudenbach | 404/41 X |
| 3,343,468 | 9/1967 | Schraudenbach | 404/38 |
| 4,111,585 | 9/1978 | Mascaro | 404/36 X |
| 4,118,892 | 10/1978 | Nakamura et al. | 47/33 X |

FOREIGN PATENT DOCUMENTS 1221354 2/1971 United Kingdom .................. 404/34

*Primary Examiner*—Stephen J. Novosad
*Assistant Examiner*—John F. Letchford
*Attorney, Agent, or Firm*—Frank D. Gilliam

[57] ABSTRACT

A modular system of rectangular pavers which can be laid down across a grass area to support foot or vehicle traffic while permitting grass to grow through apertures in the pavers. Each paver is made up of a base plate having a rectangular grid of upstanding walls secured thereto. An aperture is provided through the base plate within each grid cell. The maximum distance between opposite walls in each cell is about one inch. Typically, the pavers will have thicknesses of up to about one inch. The base plates extend slightly beyond the edge of the grid on two sides, with the grid extending the same distance beyond the base plate on the other two sides so that a plurality of pavers can be assembled in a contiguous overlapping relationship. Abutting pavers may be secured together, such as by staples. To hold the assembly in place, anchoring spikes are provided having a rectangular head corresponding to the interior area of the bottom of each cell and an elongated, pointed shaft. The spike is forced into the soil through one of the apertures until the head contacts the bottom of the cell. The pavers are preferably formed from high density polyethylene or a similar material.

11 Claims, 6 Drawing Figures

TURF COMPATIBLE PAVER SYSTEM

BACKGROUND OF THE INVENTION

This invention relates in general to turf pavers and, more specifically, to an improved turf compatible paver system having a number of advantages when used for golf cart paths or the like.

Concrete blocks or grids having a number of apertures have been used for some time for driveways, parking areas and the like. Blocks are laid with the apertures vertical and the upper block surface at the desired driving level. The apertures are partially filled with soil and grass is planted therein. The blocks have sufficient strength to be driven upon by automobiles or other vehicles and the grass pattern provides an attractive appearance. The blocks protect the grass from direct impact on grass roots and crowns, prevent mud and limit or prevent erosion from water running across the area. Typical of such paving blocks are those described in U.S. Pat. Nos. 3,301,148, 3,343,468, and 4,370,075.

While these concrete blocks are excellent for use in parking lots, driveways and roads, they have a number of disadvantages when used for golf cart paths, patios or the like. They are heavy, difficult to install and expensive. The pattern of concrete grid and grass area is large scale, with much concrete showing. When used for golf cart paths or paths across the outfield of a part-time baseball field or similar facilities, a ball that bounces on them will rebound much more sharply than normal if it squarely hits a concrete area or will rebound erratically at an odd angle if it strikes the edge of corner of the concrete grid. This requires that golf cart paths be located in the rough, requiring players to walk from the path into the fairway, or even to the opposite side of a fairway to hit a shot, slowing play greatly. Paths across ball field areas in multi-use parks cannot safely use concrete pavers because of the danger of erratic bounces as a fielder attempts to catch a bouncing ball. Such large-scale pavers are not comfortable for walking along, especially for women wearing high heeled shoes.

Attempts have been made to make turf pavers from plastic materials, such as is described in Mascaro's U.S. Pat. No. 4,111,585. These are much like the concrete turf pavers, except that the grid walls are much thinner, allowing a greater grass area relative to grid area. The cells are relatively, large and deep appearing to have widths of greater than 2 inches in the Mascaro patent. Systems for interlocking adjacent modules tend to be inflexible, preventing slightly angling adjacent modules to allow the path to curve. Many of the concrete and plastic pavers have large notches in the upper edges of cell walls to allow grass stolons to grow from cell to cell. These notches, however, provide additional corners which may be struck by a bouncing ball, causing erratic and unpredictable bounce directions and distances.

Thus, there is a continuing need for improved turf compatible paving systems allowing easy and convenient installation, improved strength, reduced cost, and which allow a bouncing golf ball or the like to bounce in a normal manner, substantially the same as from turf.

SUMMARY OF THE INVENTION

The above-noted problems, and others, are overcome by my invention which, basically, comprises a modular system of overlapping rectangular pavers which, when installed on soil, allow grass to grow up through apertures in the pavers while protecting the grass roots and crowns from foot or vehicle traffic thereover. A rectangular grid of intersecting walls is secured to a base plate having an aperture within each grid cell. The maximum distance between opposite walls in each cell is about 1 inch, although walls are preferrably more closely spaced for some applications. Preferably the pavers have a combined grid and base thickness of up to about 1 inch. The base plate extends slightly beyond the grid on two sides, of the paver and the grid extends beyond the base plate the same distance on the other two sides so that a number of the pavers can be assembled in a contiguous overlaping relationship. A set of pavers may have the base plate extending on either two opposite sides or two adjacent sides, as desired.

Adjacent pavers may be secured together by any suitable fastener. I prefer to staple abutting walls together by inserting the stapler head and anvil into cells along the paver sides. If necessary, larger cells may be provided at a few locations along the edge to accommodate the stapler.

To hold the assembled pavers in place, anchoring spikes are provided, each having a rectangular head corresponging to the interior floor area of each cell and an elongated, pointed shaft. The spike shaft is forced into the soil through one of the apertures until the head contacts the bottom of the cell. Once grass has grown up into the cell, the grass will help hold the assembly in place and the pavers together.

Marker blocks are also provided having a shape corresponding to the interior volume of the cells. The blocks have a selected contrasting color and can be installed in selected cells in any suitable pattern to form symbols, such as arrows, letters, numbers or other indicia.

BRIEF DESCRIPTION OF THE DRAWING

Details of my invention and of certain preferred embodiments thereof will be further understood upon reference to the drawing, wherein.

DETAILED DESCRIPTION OF THE INVENTION

Figure 1:
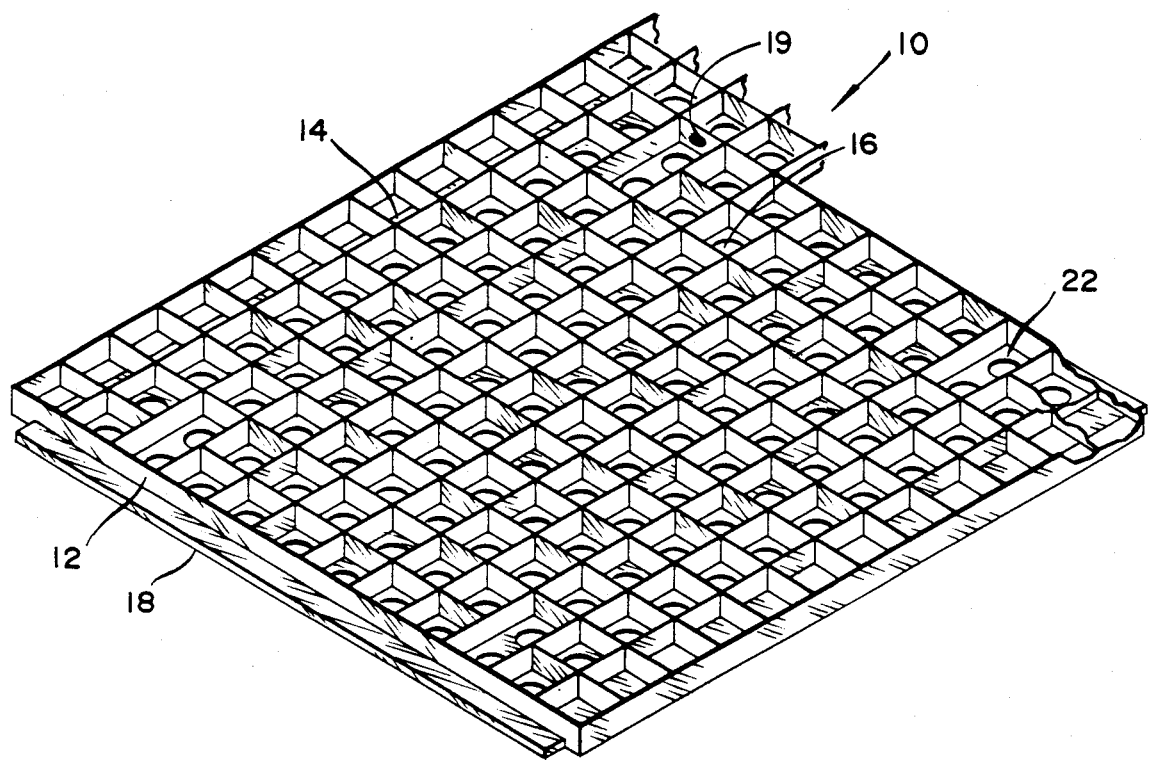
FIG. 1 is a plan view of one of my paver modules.
Figure 2:
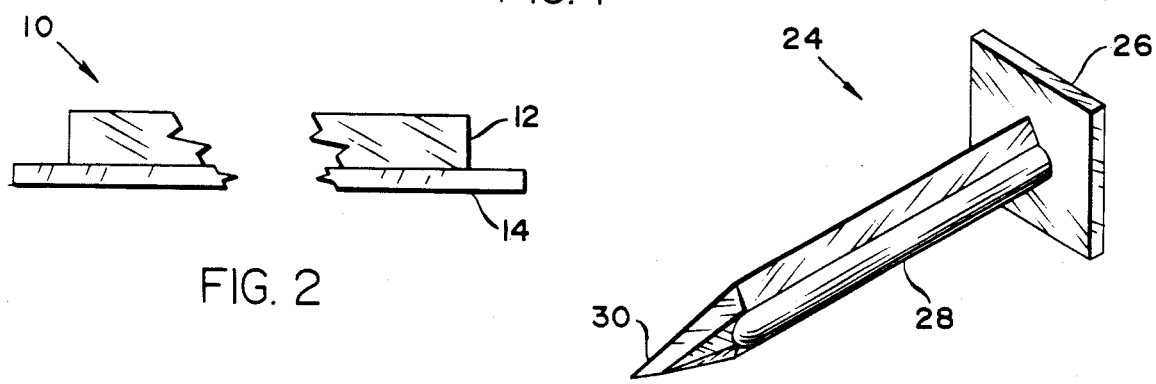
FIG. 2 is a side elevation view of the paver of FIG. 1.

Referring FIGS. 1 and 2 there is seen a paver module 10, including a grid of upstanding walls 12 and a baseplate 14. An aperture 16 is provided through base plate 14 within each grid cell. While it is preferred that each cell have an aperture, if desired some cells, such as those along the paver edges, could have solid bottoms. While apertures 16 may have any suitable size and shape, round holes are preferred to avoid stress concentrations and from about 15% to 40% of baseplate 14 (not including the open areas along recessed edges to be covered by lateral support strips, as detailed below) should be open for an optimum combination of grass grow-through area and paver strength. I prefer a baseplate open area of about 30%.

The shape of the grid cells could be a rectangle other than square, ifdesired, although square cells are preferred for uniformity. Rectangular cells and rectangular pavers are preferred to provide straight uniform edges along paths, for ease of installation and for their ability to be relatively angled or offset slightly to form a curving path. The distance between opposite walls in any cell should be no greater than 1 inch except for those edge cells which may be enlarged to accommodate the stapler. This provides an optimum combination of strength and unobtrusiveness and, most importantly when used for golf cart paths, allows a bouncing golf ball to bounce straight and true, without the higher or erratic bounce which results from impact with solid paving or edges of walls of larger cells. If desired, smaller cell widths may be used. For example, in areas where anyone is likely to be walking in high heels, a spacing of about 0.25 inch or even less may be preferred.

Walls 12 may have any suitable height and thickness and base plate 14 may have any suitable thickness. With my recommended plastic materials, wall and base plate thicknesses of around 0.1 inch have proven very effective. Greater thickness may be used, but are wasteful of material and may stiffen the walls to the point where an impacting golf ball will rebound too sharply while much thinner walls may lack strength. Walls 12 may have heights of up to about 1 inch, although I have found that about 0.5 inch to be particularly effective.

Walls 12 and base plate 14 may be manufactured by any suitable method. Injection molding as a unitary structure is preferred for easy and economical mass production. While any suitable synthetic resin may be used, I have found that strong but resilient materials such as high density polyethylene, polypropylene and acrilonitrile-butadiene-styrene (ABS) give best results. Preferably, ultraviolet absorbers are included in the material to increase the life of the paver in the sunlight. For optimum results with golf cart paths, I have found that high density polyethylene provides the best combination of long useful life and a golf ball bounce most similar to that on normal turf.

In order to provide easy assembly of large numbers of pavers 10 over large areas, means are provided to slightly overlap or interlock with adjacent pavers. Base plates 14 include extended ends 18 which project beyond grid walls 12 a selected distance on two sides. Thus, a second paver identical to that shown can be rotated 90 degrees and moved into an overlapping, contiguous relationship with the first paver.

Abutting pavers are secured together by a suitable number of heavy duty staples 19 through the contacting outermost walls of adjacent pavers or a paver and a lateral support strip of the sort described below. Generally, 1 to 3 staples between paver pairs or pavers and support strips is sufficient. If necessary for the placement of the staples, a suitable number of corresponding edge cells 22 can be made somewhat oversized to permit entrance of the stapler head and anvil in setting the staple. Conventional heavy duty staplers may require a few edge cells 22 to have dimensions of about 1 by 2 inches, although smaller stapling cells can be used with staplers having smaller heads and anvils. While staples are preferred for convenience and speed of application, any other suitable fastening technique could be used, such as "pop" rivets through holes in the abutting edge walls.

If the stapling cells 22 have a size great enough to affect the bounce of a ball impacting thereon, the cells can be filled after stapling is completed with an elastomeric block having resiliency similar to that of turf. The block could be part of a marker system as discussed below, or could have the same color as the grid or grass so as to be inconspicuous.

While metal staples will deteriorate with time, grass growing through the grid will be sufficient to hold the pavers in place.

Figure 3:
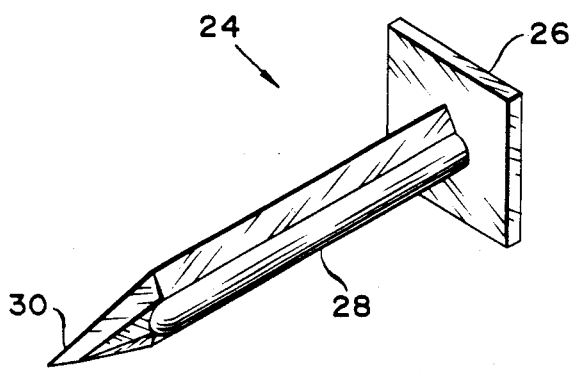
FIG. 3 is a perspective view of an anchoring spike.

To further hold the assembly of pavers in place, anchoring spikes 24 as seen in FIG. 3 are provided. Each spike includes a rectangular head 26 shaped to match the interior shape of the paver cells and downwardly extending shaft 28 having a sharpened end 30. A number of spikes 24 are forced into the soil through apertures 16 until heads 26 bottom out in the cells. The number used depending upon the installation conditions, e.g., slope, soil type, etc. The spikes may be made from any suitable material such as metal or high strength plastic. High density polyethylene is preferred for ease of manufacture by injection molding, low cost and long useful life. By the time any spike material deteriorates, grass growing through the grid will hold the pavers in place.

Figure 5:
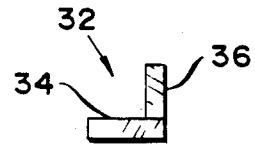
FIG. 5 is an end view of the strip of FIG. 4.
Figure 4:
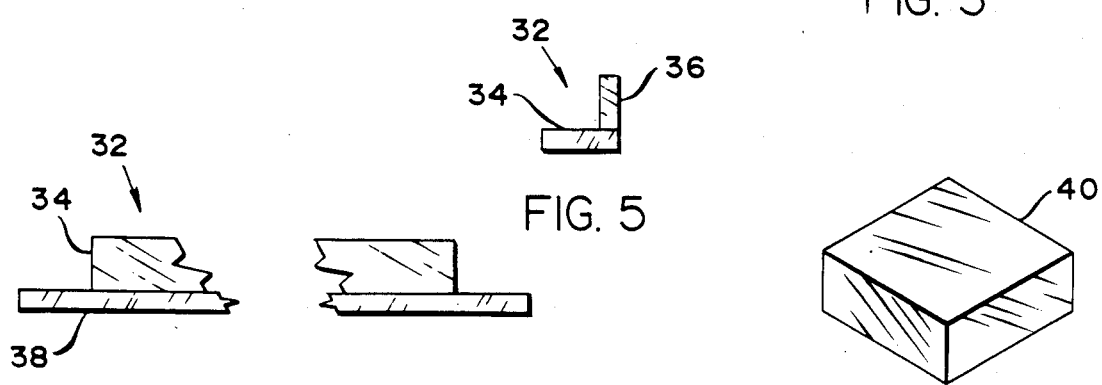
FIG. 4 is a plan elevation view of a lateral support strip.

Alternate pavers along the edge of an assembly will have recessed base plate ends 14 exposed. Since the outermost walls 12 along those edges is not well supported, those outermost walls will tend to be weak. To overcome this potential problem, lateral support strips 32 as seen in FIGS. 4 and 5 are provided. Strips 32 include a base portion 34 having a thickness the same as that of base plate 14 and an upstanding wall portion 36 having a height equal to the height of walls 12 but preferably a thickness slightly greater than that of walls 12 for added edge strength. For optimum strength, the ends 38 of wall portions 36 have lengths greater than that of the adjacent wall so that ends 38 can overlap the extended ends 18 of the adjacent pavers in the assembly. If desired, wall portions 36 can be stapled to the adjacent paver wall to hold the strips 32 in place.

Figure 6:
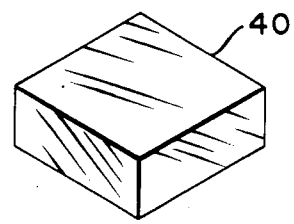
FIG. 6 is a perspective view of a marker block.

Blocks 40, as seen in FIG. 6, sized to fit snugly within the cells of paver 10 with block upper surfaces aligned with the upper edges of walls 12 may be used to form symbols, numbers or other indicia across the surface of a paver assembly. For example, blocks of a selected contrasting color can be used to form directional arrows, form numbers giving the distance along a golf cart path to the green, etc. Blocks 40 can be made of a resilient material slightly wider and/or longer than the cell interior dimensions so as to be held in place by friction. Alternatively, a short spike could be provided on the bottom of each block 40 to be pushed into the soil through apertures 16. Or, permanent markers could be simply glued in place. Blocks 40 of two sizes would be provided, one to fit the majoity of cells and the other to fit cells 22.

While certain preferred dimensions, materials and arrangements have been detailed in the above description of preferred embodiments, these can be varied where suitable. Adjacent pavers can be offset slightly, typically up to 1 inch to permit a path to curve. Since a golf ball rebounds from these pavers much the same as from turf, a golf cart path could be installed down the center of a fairway, speeding play since players will not have to walk to their balls from a path along or beyond the edge of the fairway.

Other variations, applications and ramifications of this invention will occur to those skilled in the art upon reading this specification. These are intended to be included within the scope of this invention, as defined in the appended claims.

What is claimed is:

1. A turf compatible modular system of pavers especially adapted for use on portions of turf playing surfaces against which balls impact and rebound during play, said systems comprising:
    a substantially flat, rectangular base plate;
    a rectangular grid formed by a plurality of intersecting upstanding walls on said base plate forming a plurality of rectangular cells;
    said base plate and grid together having a thickness of up to about 1 inch;
    the distance between opposite walls of a majority of said cells being up to about 1 inch;
    apertures through said base plate within at least most of said cells, the total aperture area being from about 15% to 40% of the baseplate area;
    said base plate extending about 0.25 to 0.5 inch beyond the edge of said grid along two sides of said grid and recessed an equal distance along the remaining two sides whereby a plurality of pavers can be placed in an abutting, overlapping arrangement; and
    a plurality of lateral support strips comprising an elongated base portion having a thickness equal to the thickness of said base plate, an elongated wall portion secured along one edge of said base portion at about a right angle thereto, said wall portions include extended ends adapted to overlap the base plate extended ends of adjacent pavers, said base portion sized to fill the recessed area of said base plate with said wall portion abutting the outer most wall along the recessed edge of said paver.

2. The system according to claim 1 wherein each paver has at least one cell along at least two edges which is enlarged sufficiently in a direction away from the edge to allow entrance of a stapler head or anvil thereinto and contacting outermost walls of adjacent pavers are secured together by staples extending through said contacting walls between said enlarged cells.

3. The system according to claim 1 further including a plurality of anchoring spikes with rectangular heads having shapes corresponding to the shape of the bottoms of said cells and pointed shafts extending downwardly from said heads, said shafts being adapted to being forced into the soil through selected base plate apertures until the heads bottom out in said cells to help hold said pavers in place on a soil surface.

4. The system according to claim 1 further including at least one staple extending from one edge cell through the paver outermost wall and said lateral support strip.

5. The system according to claim 1 wherein the thickness of said wall portion is greater than the thickness of said paver walls.

6. The system according to claim 1 further including a plurality of blocks each shaped to fill one of said cells and having a selected color to contrast with said paver and grass whereby selected viewable symbols or patterns can be formed in an assembly of pavers by placing said blocks in selected cells.

7. The system according to claim 1 wherein said paver is formed from high density polyethylene containing ultraviolet inhibitors.

8. The system according to claim 1 wherein the cells are substantially square, the thickness of said walls and base plate of each about 0.1 inch, the thickness of the paver is about 0.5 inch and the aperture area in most cells is about 30% of the cell floor area.

9. A turf compatible modular system of pavers especially adapted for use on portions of turf playing surfaces against which balls impact and rebound during play, said system comprising:
    a substantially flat, rectangular base plate;
    a rectangular grid formed by a plurality of intersecting upstanding walls on said base plate forming a plurality of rectangular cells;
    said base plate and grid together having a thickness of up to about 1 inch;
    the maximum distance between opposite walls of a majority of said cells being about 1 inch;
    apertures through said base plate within at least most of said cells, the total aperture area being from about 15% to 40% of baseplate area;
    said base plate extending about 0.25 to 0.5 inch beyond the edge of said grid along two sides of said grid and recessed an equal distance along the remaining two sides whereby a plurality of pavers can be placed in an abutting, overlapping arrangement;
    a plurality of lateral support strips each having an elongated base portion having a thickness equal to the thickness of said base plate, an elongated wall portion secured along one edge of said base portion at about a right angle thereto, said base portion sized to fill the recessed area of a paver baseplate with said wall portion in contact with the outermost wall along a recessed edge of the paver; and
    at least one cell along two opposing grid edges being enlarged sufficiently in a direction away from the adjacent grid edge to allow entrance of a stapler head or anvil thereinto and contacting outermost walls of adjacent pavers being secured together by staples extending through said contacting walls between said enlarged cells.

10. The system according to claim 9 wherein said majority of cells are substantially square, the thickness of said walls and base plate are each about 0.1 inch, the thickness of the paver is about 0.5 inch and the aperture area in most cells is about 30% of the cell floor area.

11. The system according to claim 9 wherein said paver is formed from high density polyethylene containing ultraviolet inhibitors.

* * * * *